Oct. 18, 1938.   H. C. DAVIS   2,133,319

HEAT EXCHANGER

Filed July 1, 1937    3 Sheets-Sheet 1

INVENTOR
HOWARD C. DAVIS.

BY
Victor D. Borst
ATTORNEY

Oct. 18, 1938.     H. C. DAVIS     2,133,319

HEAT EXCHANGER

Filed July 1, 1937     3 Sheets-Sheet 3

INVENTOR
HOWARD C. DAVIS.
BY
Victor D. Borst
ATTORNEY

Patented Oct. 18, 1938

2,133,319

UNITED STATES PATENT OFFICE 2,133,319

HEAT EXCHANGER

Howard C. Davis, Elizabeth, N. J.

Application July 1, 1937, Serial No. 151,383

9 Claims. (Cl. 126—343.5)

In certain industries, it is desirable to effect a rapid transfer of heat from one substance to another in order to effectuate either a change in temperature or a change in the condition of one of the substances or both. An example of this is to be found in the baking industry in which, for example, eggs are delivered to the baker in thirty-pound cans, the eggs being frozen into one solid mass within the can. Before these eggs may be used, they must be thawed to the liquid state. In the process of effectuating this change from a solid to a liquid state, it is important that no portion of the eggs exceed a temperature of 80° F. Heretofore, it has been the practice to place such cans of frozen eggs in a trough through which warm water flows. By this method it requires from four to six hours to thaw out a can of frozen eggs.

It is an object of this invention to provide a heat exchange device of general application; that is especially suitable and efficient in effecting a transfer of heat between two substances and that when used for such purposes as thawing frozen eggs and like materials substantially reduces the time required to effect the necessary exchange of heat.

In accordance with the invention, there is provided a heat exchange device for transferring heat from one substance to another that includes a container for each of the substances. One of the containers is in contact with the substance of the other container and mechanism is provided for effecting relative movement between the containers and primarily between one of the containers and the substances between which the transfer of heat takes place. The direct contact of the substances with the container provides a direct path for the transmission of heat. The relative movement of the substances with respect to the wall of the container through which heat passes from one substance to another prevents the formation of heat insulating films on the surfaces of the wall and serves to effect a uniform distribution of heat through the substance receiving heat.

Such a heat exchange device, embodying the invention, is disclosed in the accompanying drawings in which.

Figure 1:
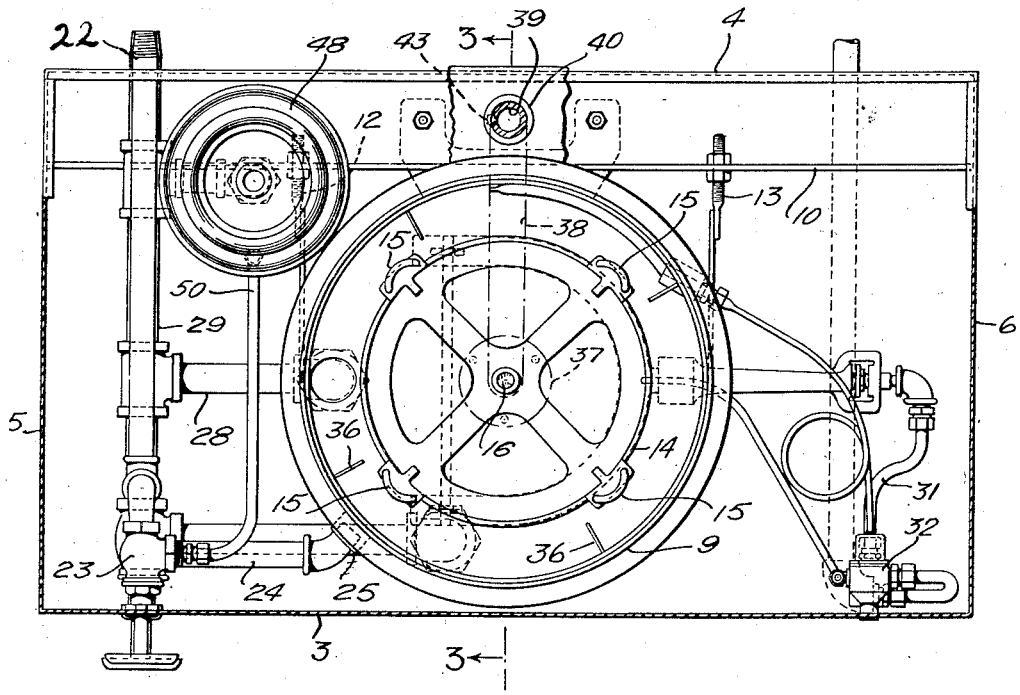
Fig. 1 is a plan view.
Figure 2:
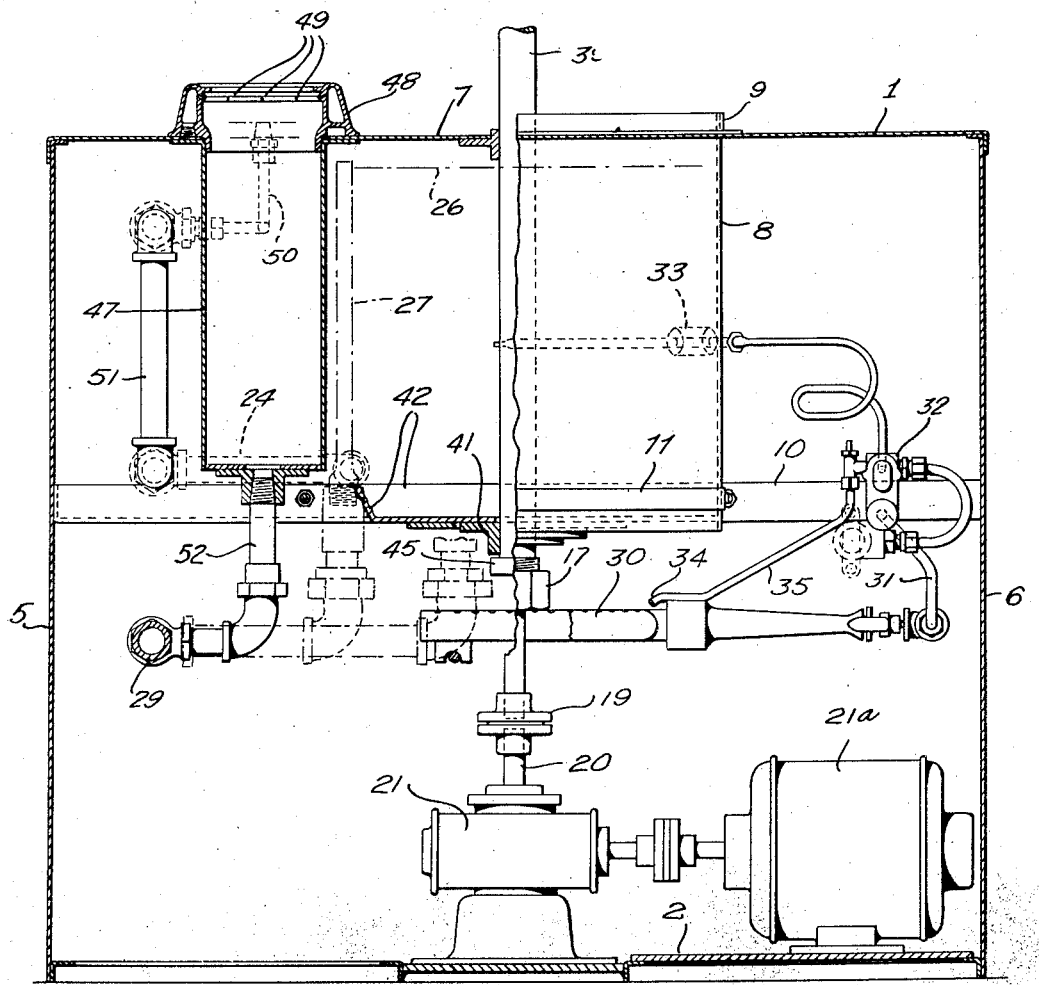
Fig. 2 is a side elevation partly in section.
Figure 3:
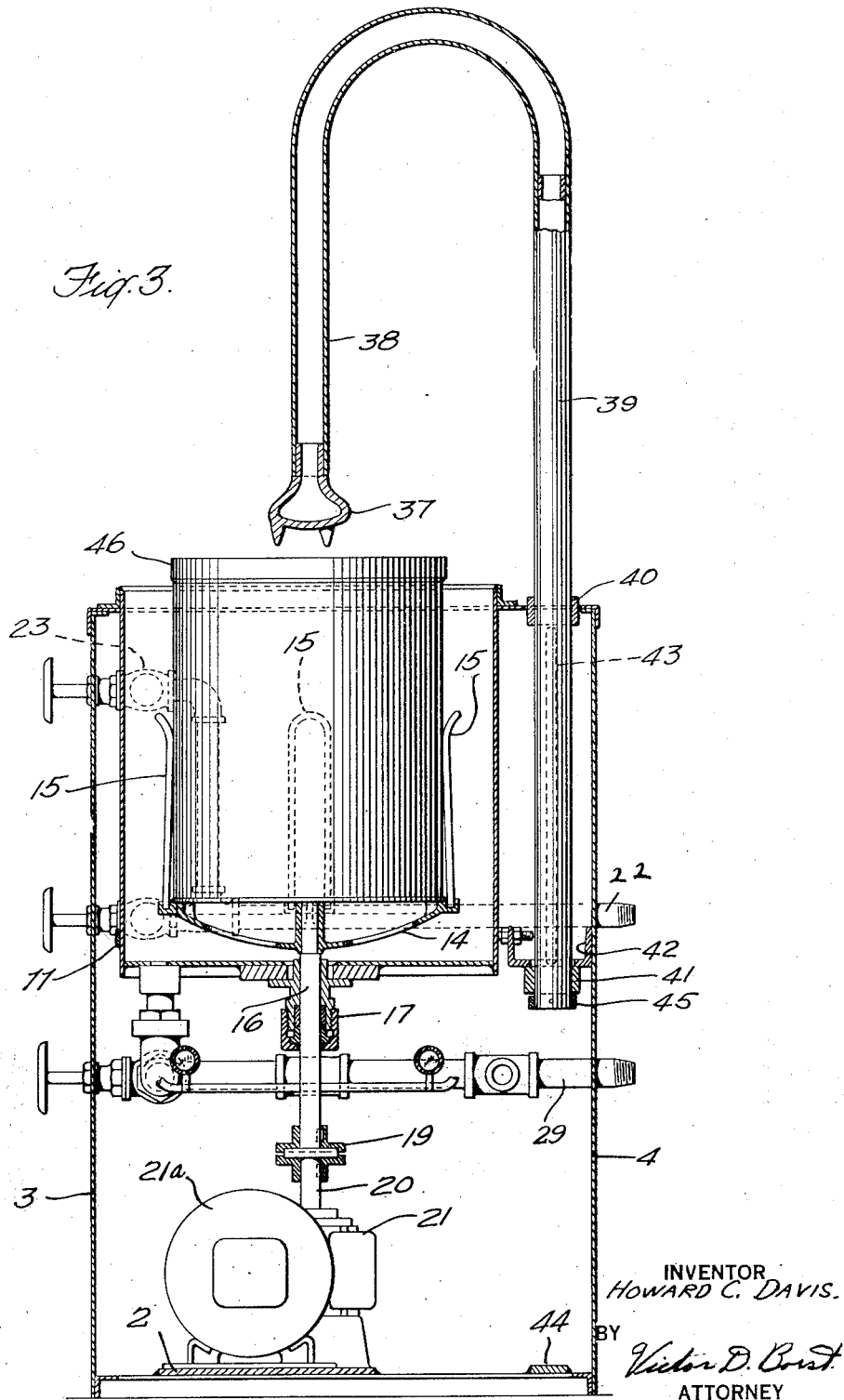
Fig. 3 is a sectional end elevation.

The particular heat exchange device illustrated in the drawings is especially suitable for thawing frozen eggs. As previously stated, eggs are commonly delivered to the baker in 30-pound cans, the eggs being frozen solid and at a temperature of from 5°–10° F. The device illustrated in the drawings is particularly suitable for thawing eggs that are delivered in this manner.

The heat exchange device consists of a case 1 that includes a base 2, side walls 3 and 4, and end walls 5 and 6. The side and end walls are secured to and extend upwardly from the base 2. The case also includes a top 7 which extends over the upper edges of the side and end walls and is secured thereto as by welding. All of the mechanism included in the heat exchange device is mounted within this casing.

Within the casing and substantially at the center thereof there is mounted a container 8. The container 8 extends through an opening in the top 7 and it is secured to the top 7 by a circular angle iron 9. The lower end of the container 8 is secured to a support 10 which extends between and is secured to the end walls 5 and 6. The container is secured to the support 10 by a strap 11 which extends partially around the container and that is secured to the support 10 by bolts 12 and 13. The container is thus rigidly fixed within the case.

Within the container 8 there is mounted a turntable 14 that is provided with four vertically extending fingers 15 spaced angularly 90° apart. The turntable 14 is mounted upon a vertical shaft 16 that extends through the bottom of the container 8. The shaft 16 also extends through a stuffing box 17 and it is connected through a coupling 19 to shaft 20 of a reduction gearing 21. The reduction gearing 21 is mounted on the base 2 and it is connected to an electric motor 21a also mounted on the base 2. The shaft 16 is thus driven by the electric motor 21a through the reduction gearing 21. The reduction gearing is such that the shaft 16 is driven at a speed of approximately 150 to 200 revolutions per minute. The fingers 15 mounted upon the turntable 14 are provided for frictionally engaging a can of frozen eggs and for clamping the can of frozen eggs to the turntable so that the can is caused to partake of the movement of the turntable.

In the defrosting of eggs, water is used in the container 8 and for this purpose there are provided water connections to the container 8. These water connections include a pipe 22 that extends through the side wall 4. This pipe is connected through a valve 23 to a pipe 24 that enters the side of the container 8 at 25. The container 8 may thus be filled by opening the valve 23, the pipe 22 being connected to the source of water supply. The level of the water in the container 8 is indicated by the line 26 and for the purpose of maintaining the water at this level and preventing it from overflowing the top of the container there is provided an overflow pipe 27. This overflow pipe extends through the bottom of the container and is connected by a pipe 28 to a drain pipe 29. The pipe 29 also extends through the side wall 4 of the case.

The water in the container 8 is heated through a gas burner 30 which is connected through a pipe 31 and an automatic valve 32 to the gas supply pipe. The automatic valve 32 may be of a standard make and it is controlled by an aquastat 33 of any well known type. A pilot light thus remains lighted at all times and when the aquastat 33 opens the valve to the gas burner, the gas burner is lighted. The water in the container 8 is thus maintained at a uniform temperature. When thawing eggs, this water is maintained at a temperature of 80°, for if the eggs are brought to a temperature exceeding 80° F., they are spoiled.

Within the container 8 there are provided a series of radial baffles 36 for the purpose of causing the water within the container to eddy and to prevent it from partaking of the movement of the turntable when the turntable is rotating.

The coefficient of heat conductivity of eggs packaged as heretofore described is extremely low. This low heat conductivity is further retarded by a natural barrier that is formed in the change from a solid frozen to a liquid state. In the course of this change, there is a formation of a sponge-like surface over the entire mass of frozen eggs that acts as an insulation and retards the passage of heat to the body of the frozen mass. When this sponge-like surface is removed as quickly as it is formed, the coefficient of heat conductivity of the frozen egg mass may be kept constant. In the device illustrated in the drawings, this sponge-like mass formed on the surface of the frozen eggs is continuously removed by a wiping action. This wiping action is obtained in two ways. The frozen mass of eggs is prevented from rotating with the egg container that is mounted upon the turntable 14 and it is held against the bottom of the container so that the motion of the liquid portion of the egg mass wipes the sides of the egg mass and the rubbing of the bottom of the mass of eggs upon the bottom of the container maintains this latter surface free from this heat insulating sponge-like mass.

For the purpose of effecting this wiping action, there is provided a pronged disk 37 that is mounted upon the end of a gooseneck 38. The gooseneck 38 is secured to a rod 39 that is mounted in the case 1. The rod 39 extends through a collar 40 on the cover 7 of the case 1 and through a guide collar 41 that is secured to a support 42 mounted on the side wall 4 of the case. The shaft 39 is fitted with a key 43. The lower collar 41 has two keyways to receive the key 43 in the shaft 39. The key 43 and the keyways in the collar 41 serve to position the pronged disk 37 in two fixed positions, one with relation to the center of the turntable 14, and the other with relation to a washer for washing the pronged disk 37. The key 43 is slidable in the keyways on the collar 41. The extent to which the pronged disk 37 may extend into the container 8 is limited by a stop 44 mounted on the base 2. Upward movement of the pronged disk and the shaft 39 is limited by a collar 45 secured to the end of the shaft which engages the fixed collar 41.

In thawing a can of frozen eggs, a small hole is cut in the top of the can, the hole being just sufficient to receive the pronged disk 37. The can of frozen eggs 46 is then placed on the turntable 14, being pressed down so that it is firmly engaged by the fingers 15 and held to the turntable to be rotated therewith. In the position in which the pronged disk 37 is over the center of the turntable, the key 43 on the shaft 39 is received in one of the keyways in the collar 41 and the shaft 39 is free to move downwardly to carry the pronged disk into contact with the frozen eggs within the can 46. The water in the container 8 has been previously heated to a temperature of 80° F. at which temperature it is maintained by the aquastat 33. The mass of eggs within the container is soon loosened from the side walls of the can 46 and from thence forward it is held stationary by the pronged disk 37. The weight of the pronged disk 37 and the shaft 39 is sufficient to maintain the mass of frozen eggs against the bottom of the can 46. Supplementary weights may be affixed to the shaft 39 if required or desired.

The motor 21a is operated and causes the turntable 14 to rotate, at a speed of 150–200 revolutions per minute. The rotation of the can 46 with the turntable causes turbulence of the water in the container 8. This turbulence is caused by virtue of the baffles 36 which prevent the water in the container from rotating with the turntable. The fingers 15 of course act somewhat as paddles and assist this turbulence. The turbulence of the water in the container 8 prevents the formation of a film on the surface of the can 46 which would retard the transfer of heat from the water in the container to the wall of the can. Within the can 46, the liquid egg mass is likewise maintained in a turbulent state. This is due to the fact that the can 46 is rotating and the solid egg mass is held stationary. This turbulence of the liquid egg mass causes a wiping action on the inner surface of the container and prevents the formation of a film thereon. It likewise prevents the formation of a film on the solid egg mass and thus the heat is transferred to the egg mass uniformly.

For cleaning the pronged disk 37 there is provided a washing container 47. The washing container is mounted in the case 1 and secured to the top or cover 7. This washing container is provided at its upper end with an annular fixture 48 that is provided with a series of spray holes 49. To this fixture there is connected a water supply pipe 50 that is connected to the pipe 22 by a pipe 51. The container 47 has a drain connection 52 from which the water introduced through the fixture 48 is drained from the container. When the shaft 39 is raised so that the pronged disk 37 is out of the egg-containing can 46, it may be swung about the axis of the shaft 39 until the key 43 on the shaft 49 coincides with the other keyway on the collar 41. When this position is reached the pronged disk 38 is directly over the container 47 and upon downward movement of the shaft, the pronged disk 37 passes through the spray of water provided by the fixture 48. The pronged disk 37 is thus cleansed.

From the foregoing it will be seen that there is provided by this invention a heat transfer device in which the maximum efficiency of heat transfer is attained. In the particular device disclosed, all the heat transfer surfaces are wiped to avoid the formation of heat insulating films. Likewise, the temperature of the water in the container is maintained at a temperature such that the contents being thawed can never exceed the critical temperature. In the thawing of eggs this heat transfer device takes approximately one-tenth of the time to completely liquefy a can of frozen eggs that it takes for thawing equipment heretofore in use.

It will be obvious that various changes may be made by those skilled in the art in the details of the embodiment of the invention illustrated in the drawings and described in detail above within the principle and scope of the invention as expressed in the appended claims.

I claim:

1. In a heat exchange device for thawing a substance frozen solid, the combination comprising a container for a liquid, a container support within the liquid container for supporting a container holding the frozen substance, means for maintaining the liquid at a substantially uniform temperature, means for rotating the container support, and means for causing relative movement between the liquid and the solid and the containers upon rotation of the container support.

2. In a heat exchange device for thawing a frozen substance, the combination comprising a container for a liquid, a rotatably mounted container support within the liquid container for supporting a container having the frozen substance therein, means for maintaining the liquid at a substantially uniform temperature, means for rotating the container support, means for restraining movement of the frozen substance with the container support, and means for restraining movement of the liquid with the container support.

3. In a heat exchange device for thawing a frozen substance, the combination comprising a container for a liquid, a rotatably mounted container support within the liquid container for supporting a container having the frozen substance therein, means for maintaining a liquid in the liquid container at a substantially uniform temperature, means for rotating the container support, means for restraining movement of the frozen mass with the container and for maintaining the solid frozen substance in contact with the bottom of the container, and means for restraining movement of the liquid with the container support.

4. In a heat exchange device for thawing a frozen substance, the combination comprising a container for a liquid, a rotatably mounted container support within the liquid container and means on said support for engaging a container having the frozen substance therein, means for maintaining a liquid in the liquid container at a substantially uniform temperature, means for rotating the container support, and means for restraining movement of a frozen mass in a container on the support with the container.

5. In a heat exchange device for thawing a frozen substance, the combination comprising a container for a liquid, a rotatably mounted container support within the liquid container and means on said support for engaging a container having the frozen substance therein, means for maintaining a liquid in the liquid container at a substantially uniform temperature, means for rotating the container support, and means for restraining movement of a frozen mass in a container on the support with the container including a stationary element for engaging the frozen mass.

6. In a heat exchange device for thawing a frozen substance, the combination comprising a container for a liquid, a rotatably mounted container support within the liquid container and means on said support for engaging a container having the frozen substance therein, means for maintaining a liquid in the liquid container at a substantially uniform temperature, means for rotating the container support, and means for restraining movement of a frozen mass in a container on the support with the container including a slidably mounted element for engaging the frozen mass and maintaining the frozen mass in rubbing contact with the bottom of the container.

7. In a heat exchange device for thawing a frozen substance, the combination comprising a container for a liquid, baffles extending radially inwardly in the container, a rotatably mounted container support within the liquid container, means on said container support for frictionally engaging a container having the frozen substance therein, means for maintaining a liquid in the liquid container at a substantially uniform temperature, means for rotating the container support, and means for restraining movement of the frozen mass in a container on the support including a slidably mounted element for engaging the frozen mass and maintaining the frozen mass in rubbing contact with the bottom of the container.

8. In a heat exchange device for transferring heat from one substance to another, the combination comprising a container for one of the substances, another container for the other substance, in the first mentioned container, means for maintaining the substance in one of the containers at a substantially uniform temperature, and means for effecting relative movement between the containers and between the substances and the containers comprising means for rotating one of the containers and means for restraining movement of the substances with the containers.

9. In a heat exchange device for thawing a frozen substance, the combination comprising a container for a liquid, another container for the frozen substance in contact with the liquid in the first mentioned container, means for effecting relative movement between the container for the frozen substance and the liquid container, means for effecting relative movement between the frozen substance and the container therefor including means for maintaining the frozen substance in rubbing contact with the container.

HOWARD C. DAVIS.